(12) United States Patent
Ikegami et al.

(10) Patent No.: US 8,020,523 B2
(45) Date of Patent: Sep. 20, 2011

(54) ABSORBENT ARTICLE FOR ANIMAL

(75) Inventors: Takeshi Ikegami, Shinagawa-ku (JP); Kenji Hiroshima, Shinagawa-ku (JP)

(73) Assignee: Uni-Charm Corporation, Ehime (JP)

( * ) Notice: Subject to any disclaimer, the term of this patent is extended or adjusted under 35 U.S.C. 154(b) by 336 days.

(21) Appl. No.: 11/352,190

(22) Filed: Feb. 10, 2006

(65) Prior Publication Data
US 2006/0217678 A1 Sep. 28, 2006

(30) Foreign Application Priority Data

Mar. 28, 2005 (JP) ................................ 2005-090702

(51) Int. Cl.
*A01K 33/00* (2006.01)
*A61F 13/15* (2006.01)
(52) U.S. Cl. ................................... 119/869; 604/385.01
(58) Field of Classification Search ............ 604/385.09, 604/386, 389–396
See application file for complete search history.

(56) References Cited

U.S. PATENT DOCUMENTS

| | | | | |
|---|---|---|---|---|
| 3,646,937 A * | 3/1972 | Gellert | | 604/390 |
| 4,074,716 A * | 2/1978 | Schaar | | 604/390 |
| 4,209,016 A * | 6/1980 | Schaar | | 604/390 |
| 4,410,326 A * | 10/1983 | Dussaud et al. | | 604/390 |
| 4,500,316 A * | 2/1985 | Damico | | 604/389 |
| 4,662,875 A * | 5/1987 | Hirotsu et al. | | 604/389 |
| 4,826,499 A * | 5/1989 | Ahr | | 604/389 |
| 4,850,988 A * | 7/1989 | Aledo et al. | | 604/385.21 |
| 4,996,949 A | 3/1991 | Wunderman et al. | | |
| 5,146,874 A * | 9/1992 | Vidal | | 119/868 |
| 5,234,421 A * | 8/1993 | Lowman | | 604/385.09 |
| 5,370,634 A * | 12/1994 | Ando et al. | | 604/385.21 |
| 5,954,015 A * | 9/1999 | Ohta | | 119/850 |
| 6,004,306 A * | 12/1999 | Robles et al. | | 604/385.21 |
| 6,045,543 A * | 4/2000 | Pozniak et al. | | 604/385.01 |
| 6,895,901 B1 * | 5/2005 | Howard | | 119/869 |
| 7,059,505 B2 * | 6/2006 | Tabor | | 225/2 |
| 7,077,834 B2 * | 7/2006 | Bishop et al. | | 604/385.11 |
| 7,449,017 B2 * | 11/2008 | Yoshida | | 604/389 |
| 2003/0032933 A1 * | 2/2003 | Sayama | | 604/386 |
| 2003/0055389 A1 * | 3/2003 | Sanders et al. | | 604/358 |
| 2003/0135192 A1 * | 7/2003 | Guralski et al. | | 604/391 |
| 2004/0087929 A1 * | 5/2004 | Mleziva et al. | | 604/391 |

(Continued)

FOREIGN PATENT DOCUMENTS

DE 198 27 997 A1 12/1999
(Continued)

OTHER PUBLICATIONS

English abstract of DE 19827997.*

(Continued)

*Primary Examiner* — Melanie Hand
(74) *Attorney, Agent, or Firm* — Brinks Hofer Gilson & Lione

(57) ABSTRACT

An absorbent article for an animal has an interior surface for facing the animal and an exterior surface opposite the interior surface. The absorbent article includes an abdomen part for facing the abdomen of the animal and a back part for facing the back of the animal. Two engaging members, which are capable of being removably secured to the exterior surface of the back part, are provided on each side of the abdomen part and spaced apart from each other in a longitudinal direction along which the abdomen and back parts are arranged.

16 Claims, 12 Drawing Sheets

U.S. PATENT DOCUMENTS

| | | | |
|---|---|---|---|
| 2004/0153046 A1 * | 8/2004 | Ito et al. | 604/391 |
| 2004/0224136 A1 * | 11/2004 | Collier et al. | 428/196 |
| 2005/0154367 A1 * | 7/2005 | Ikegami | 604/389 |
| 2005/0182375 A1 * | 8/2005 | Kropf et al. | 604/385.01 |

FOREIGN PATENT DOCUMENTS

| | | | |
|---|---|---|---|
| EP | 692188 A1 * | 1/1996 | |
| EP | 958741 A2 * | 11/1999 | |
| EP | 1 535 509 A1 | 6/2005 | |
| JP | H05-82259 | 11/1993 | |
| JP | H11-178856 | 7/1999 | |
| JP | 2002253607 A * | 9/2002 | |
| JP | 2002253608 A * | 9/2002 | |
| JP | 2003210062 A * | 7/2003 | |
| JP | 2004-159591 A | 6/2004 | |
| JP | 2005-151869 A | 6/2005 | |
| KR | 2003025965 A * | 3/2003 | |
| WO | WO 2005051276 A1 * | 6/2005 | |

OTHER PUBLICATIONS

Definitions of "cut" and "mark", Merriam-Webster OnLine.*

* cited by examiner

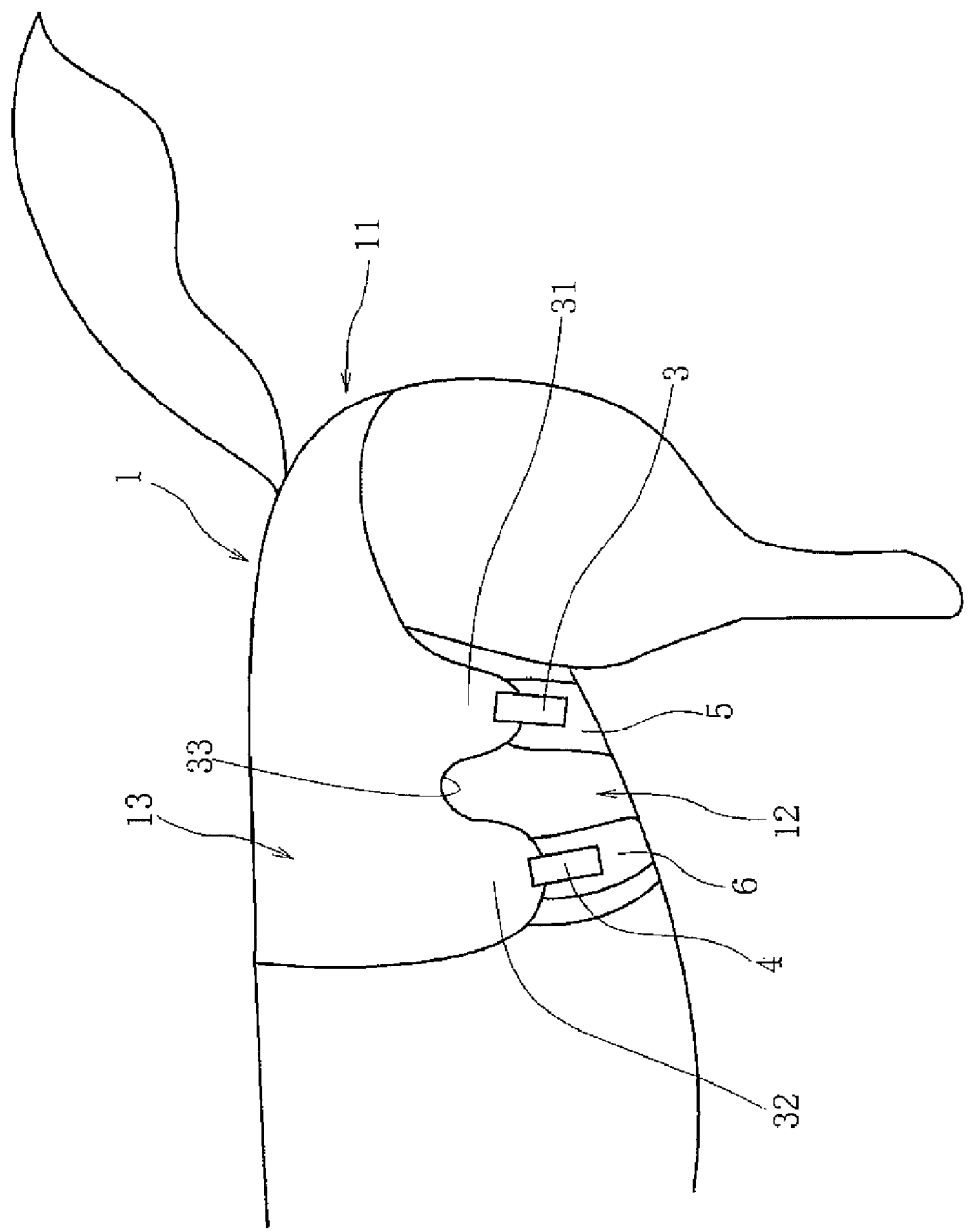

ABSORBENT ARTICLE FOR ANIMAL

INCORPORATION BY REFERENCE

The present application claims priority under 35 U.S.C. §119 to Japanese Patent Application No. 2005-090702 filed on Mar. 28, 2005 in the Japanese language, which is hereby incorporated by reference in its entirety.

BACKGROUND OF THE INVENTION

1. Field of the Invention

The present invention relates to an absorbent article to be attached to a lower body of an animal and more particularly to an absorbent article which can easily fit around the legs and the waist of a four-footed animal.

2. Description of the Related Art

Elongated absorbent articles having an abdomen part for facing the abdomen of an animal and a back part for facing the back of the animal have been used for absorbing urine, feces, or menses discharged from animals. Absorbent articles of this type are generally applied such that an intermediate portion lying between the abdomen and back parts fits around the thighs of the hind legs. At each side of the abdomen part, there is provided an attachment tab with an engaging member, such as a hook or loop member of a hook-and-loop fastener. With the abdomen part being applied to the abdomen of an animal, the attachment tabs are pulled up and secured to the exterior surface of the back part. Such an absorbent article is disclosed in Japanese Unexamined Patent Application Publication No. 2004-159591.

Absorbent articles for four-footed animals require not only that the abdomen and back parts are tightly wrapped around the waist of an animal, but that the intermediate part is tightly wrapped around the thighs of the hind legs. If the intermediate part is not tightly wrapped around the thighs, the absorbent article will be loose at the excretory part of the animal to cause leakage of urine or feces. In case of a male, furthermore, there is a possibility that the penis will protrude out of the absorbent article from the side edge of the intermediate part.

The conventional absorbent articles for animals have only one engaging member on each side of the abdomen part. In four-footed animals, however, since the thigh of the hind leg has a considerably large perimeter, the perimeter of the waist is generally as large as or smaller than the perimeter of the thigh. In addition, the area which permits fastening of the abdomen part to the back part of the absorbent article is located considerably forward of the excretory part such as the anus.

Accordingly, even if the attachment tabs are firmly secured to the exterior surface of the back part, it is difficult to ensure that the intermediate part of the absorbent article is tightly wrapped around the thighs of the hind legs. This may result in that the absorbent article is loose around the thighs and the intermediate part of the absorbent article slips down to the knees of the hind legs.

SUMMARY OF THE INVENTION

The present invention has been developed to solve the problems in the prior art set forth above and has an object to provide an absorbent article which tightly fits around both the thighs of the hind legs and the waist of a four-footed animal.

According to the present invention, there is provided an absorbent article for an animal having an interior surface for facing the animal and an exterior surface opposite the interior surface, the absorbent article comprising an abdomen part for facing the abdomen of the animal and a back part for facing the back of the animal, wherein a plurality of engaging members, which are capable of being removably secured to the exterior surface of one of the abdomen and back parts, are provided on each side of the other of the abdomen and back parts and spaced apart from each other in a longitudinal direction along which the abdomen and back parts are arranged.

In the present invention, since two or more engaging members are provided on each side, an intermediate part of the absorbent article can be tightly wrapped around the thighs of the hind legs by adjusting the position of engaging members located close to the intermediate part. On the other hand, the abdomen and back parts can be tightly wrapped around the waist by adjusting the position of engaging members located away from the intermediate part. In other words, the tightening degree and tightening direction by the engaging member may be different for the thighs and the waist.

Preferably, the engaging members are provided to be capable of increasing a longitudinal distance therebetween. This makes it possible to tighten the engaging members in different directions, ensuring that the absorbent article tightly fits around both the thighs and the waist.

According to one embodiment of the present invention, the abdomen and back parts may constitute a main body with a plurality of longitudinally separated movable parts which are integrally formed on each side of the main body and each provided with each engaging member. The movable parts, which are integral parts of the main body, may be separated from each other in the longitudinal direction by providing a recess or a cut between adjacent movable parts on each side of the main body. Each engaging member may be provided either on an attachment tab projecting laterally from each movable part or on the interior surface of each movable part.

According to another embodiment of the present invention, the abdomen and back parts may constitute a main body with a plurality of attachment auxiliary members which are disposed on each side of the main body and each provided with each engaging member. Each engaging member may be provided either on an attachment tab projecting laterally from each attachment auxiliary member or on the interior surface of each attachment auxiliary member. The attachment auxiliary member is preferably made of a stretchable material.

According to still another embodiment of the present invention, the abdomen and back parts may constitute a main body with a plurality of laterally projecting attachment tabs which are disposed on each side of the main body and each provided with each engaging member. Also in the case where two or more attachment tabs project from each side of the main body, the tightening degree and tightening direction may be made different for the thighs and waist by deforming the attachment tabs away from each other.

Preferably, the exterior surface permits repositioning of the engaging members in the longitudinal direction. For example, the exterior surface may have a landing zone which permits removable securement of the engaging members and has a larger size than the engaging members in the longitudinal direction. If the landing zone is sufficiently large, the tightening directions may be adjusted arbitrarily by the engaging members depending on the body shape of animals.

According to the present invention, since the abdomen and back parts of the absorbent article are fastened together with four or more engaging members, the absorbent article can tightly fit around both the thighs of the hind legs and the waist.

This is effective in preventing leakage of urine and feces discharged from the excretory part of an animal and slippage of the absorbent article.

BRIEF DESCRIPTION OF THE DRAWINGS

The present invention will be understood more fully from the detailed description given hereinafter and from the accompanying drawings of the preferred embodiments of the present invention, which, however, should not be taken to limit the invention, but are for explanation and understanding only.

In the drawings.

DESCRIPTION OF THE PREFERRED EMBODIMENT

The present invention will be discussed hereinafter in detail in terms of the preferred embodiment according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscuring of the present invention.

Figure 1:
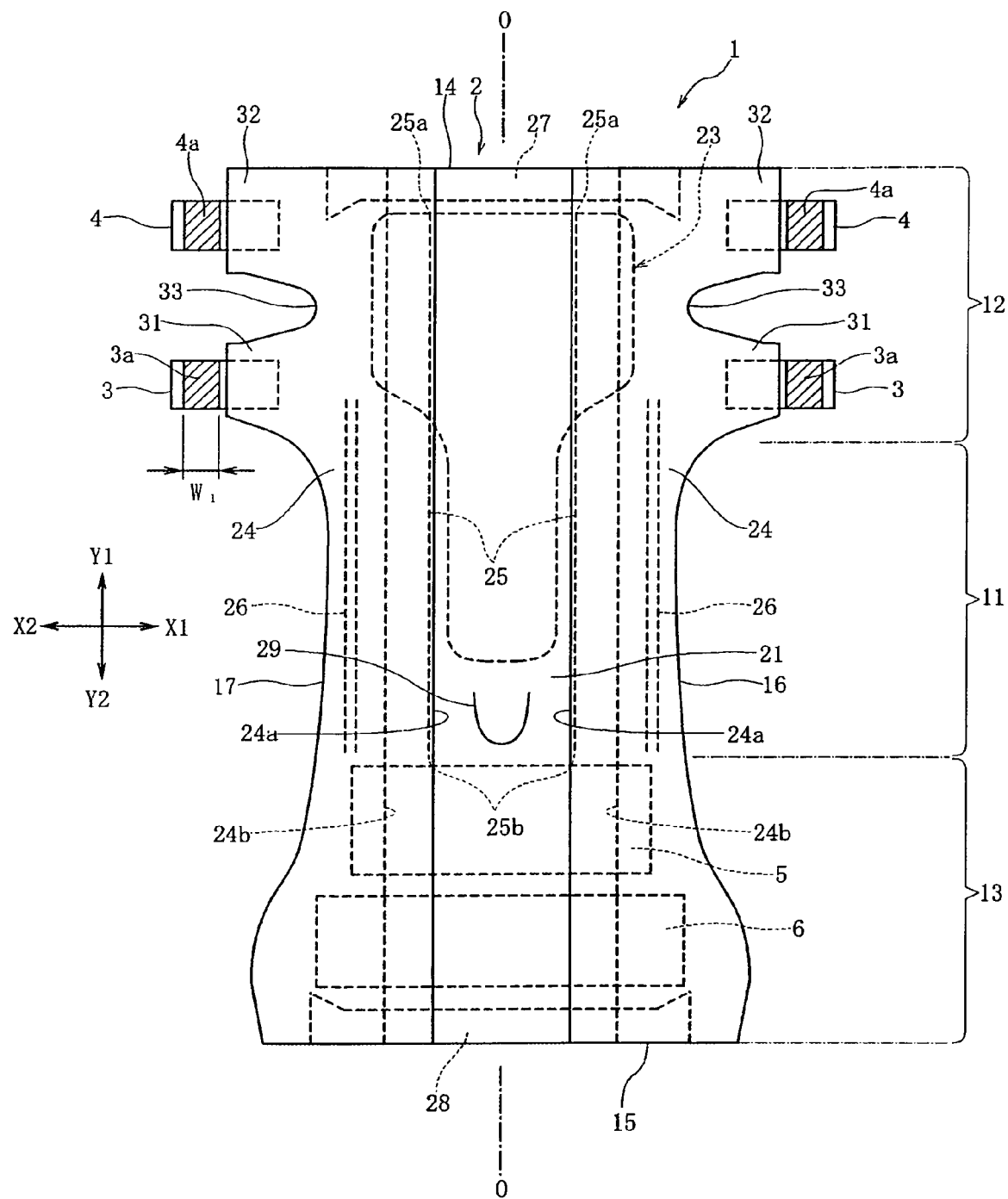
FIG. 1 is a plan view showing an interior surface of an absorbent article according to a first embodiment of the present invention.
Figure 2:
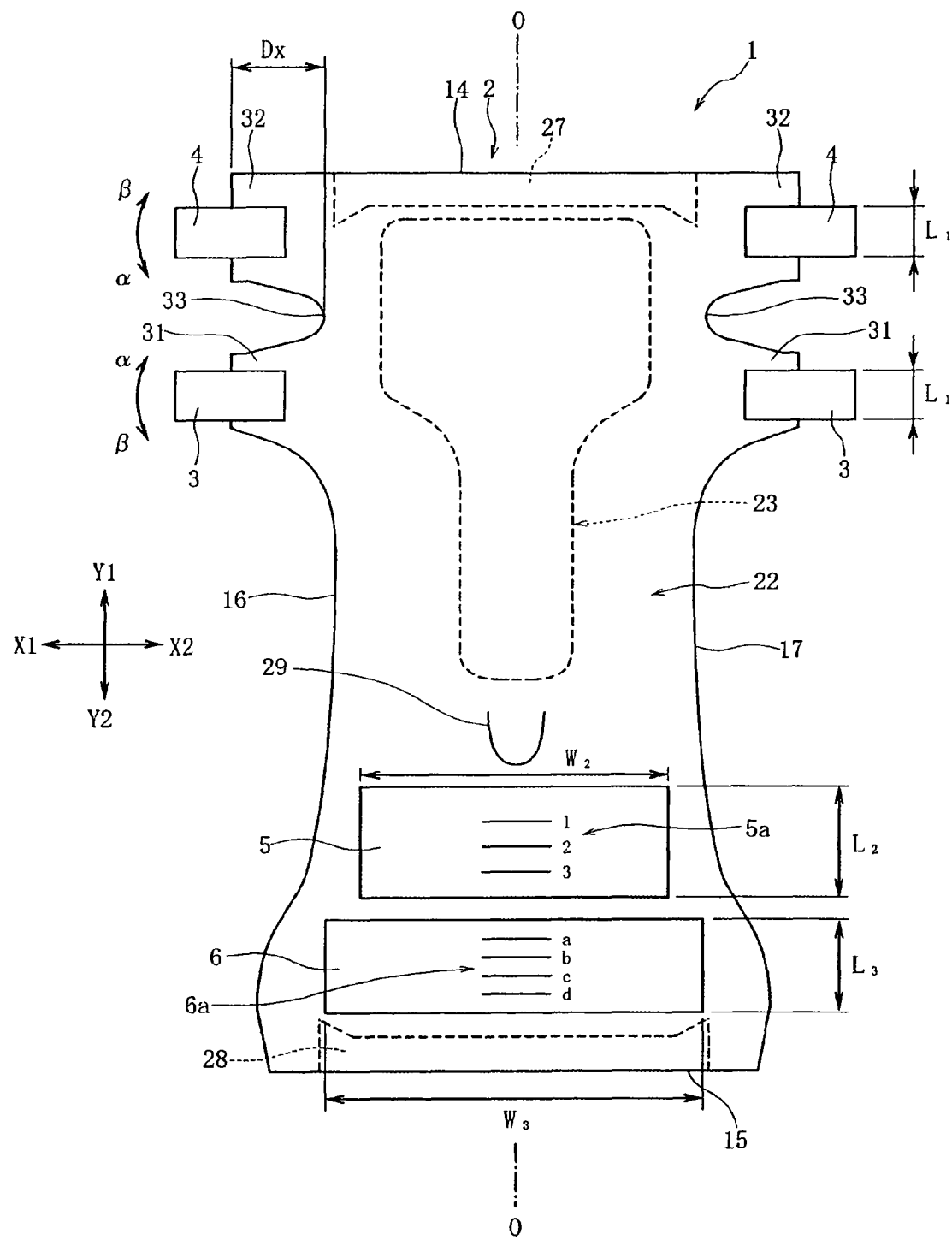
FIG. 2 is a plan view showing an exterior surface of the absorbent article of the first embodiment.

FIG. 1 is a plan view showing an interior surface of an absorbent article 1 according to a first embodiment of the present invention, and FIG. 2 is a plan view showing an exterior surface of the absorbent article 1.

As shown in FIGS. 1 and 2, the absorbent article 1 comprises a main body 2, first and second attachment tabs 3, 4, and first and second landing sheets 5, 6.

Figure 3:
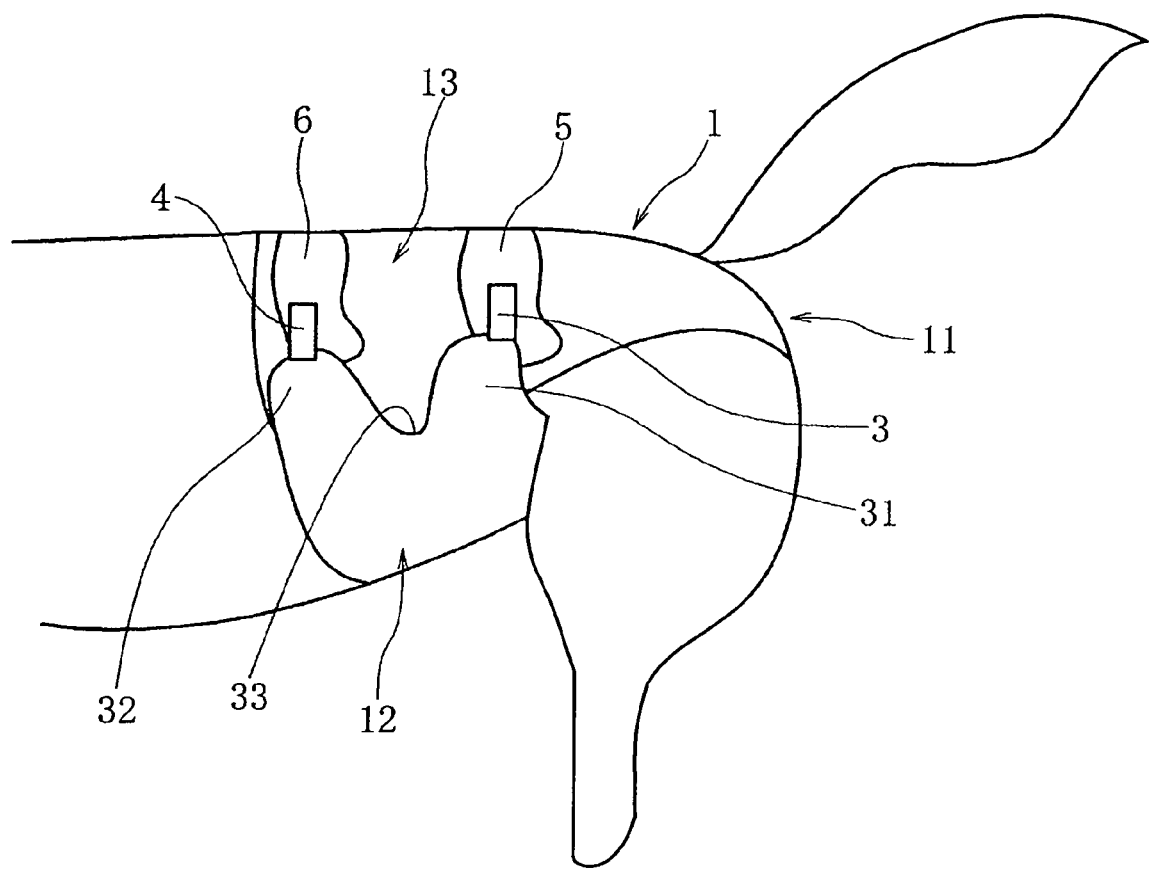
FIG. 3a is an explanatory diagram showing a state where the absorbent article of the first embodiment is applied to an animal and FIG. 3b is an explanatory diagram showing a state where an absorbent article of another embodiment is applied to an animal.

As shown in FIG. 1, the main body 2 has an intermediate part 11, an abdomen part 12 contiguous to the intermediate part 11 on one side, and a back part 13 contiguous to the intermediate part 11 on the other side. The absorbent article 1 is suitable for use as a garment for four-footed animals such as dogs and cats. As shown in FIG. 3, the intermediate part 11 is intended to be wrapped around the thighs of the hind legs. The abdomen part 12 is intended to be applied to the abdomen of the animal in front of the thighs, while the back part 13 is intended to be applied to the back of the animal in front of the thighs. The abdomen part 12 and the back part 13 are wrapped around the waist of the animal in front of the thighs.

The abdomen part 12, the intermediate part 11, and the back part 13 are arranged along the Y-axis, which is a longitudinal direction of the main body 2. The X-axis perpendicular to the Y-axis is a lateral (or transverse) direction of the main body 2. That is, the main body 2 is elongated to have a larger size along the Y-axis than along the X-axis. When the absorbent article 1 is spread on a plane as shown in FIG. 1, Y1, Y2, X1, X2 represent a direction toward the front, a direction toward the rear, a direction toward the right, a direction toward the left, respectively. Thus, the main body 2 has a front end edge 14, a rear end edge 15, a right side edge 16, and a left side edge 17.

On the interior surface side, as shown in FIG. 1, the main body 2 has a liquid-permeable interior sheet 21. On the exterior surface side, as shown in FIG. 2, the main body 2 has a liquid-impermeable exterior sheet 22. The interior and exterior sheets 21, 22 have the same contour as the main body 2 shown in FIGS. 1 and 2. Between the interior and exterior sheets 21, 22, there is disposed an absorbent core 23. The absorbent core 23 lies in the intermediate part 11 and the abdomen part 12. The interior sheet 21 and the absorbent core 23 are bonded to each other through a hot-melt type adhesive applied in such an amount as not to interfere with passage of liquid, and the exterior sheet 22 and the absorbent core 23 are also bonded to each other through a hot-melt type adhesive. In an area where the absorbent core 23 is not present, the interior and exterior sheets 21, 22 are bonded to each other through the hot-melt type adhesive. If desired, a thin absorbent layer such as a hydrophilic tissue may be disposed between the interior and exterior sheets 21, 22 in the area where the absorbent core 23 is not present.

On the interior surface side shown in FIG. 1, side sheets 24 are provided to cover right and left side portions of the interior sheet 21. The side sheets 24 are preferably impermeable to liquid. The right side sheet 24 is bonded to the interior sheet 21 between a boundary 24b and the right side edge 16, and the left side sheet 24 is bonded to the interior sheet 21 between a boundary 24b and the left side edge 17. Each side sheet 24 has a free end 24a on the inner side of the boundary 24b. Along the free end 24a, an elastic member 25 is provided to exert longitudinal elastic contractive force on the side sheet 24. The elastic member 25 has a front end 25a located close to the front end edge 14 of the main body 2 and a rear end 25b located close to a boundary between the intermediate part 11 and the back part 13.

Between the vicinity of the front end 25a and the vicinity of the rear end 25b, the side sheet 24 on the inner side of the boundary 24b remains unsecured to the interior sheet 21 to permit free movement of the free end 24a. Forward of the front end 25a and behind the rear end 25b, on the other hand, the side sheet 24 on the inner side of the boundary 24b is bonded to the interior sheet 21. When the absorbent article 1 is deformed and applied to an animal, as shown in FIG. 3, the side sheet 24 on the inner side of the boundary 24b, which is subjected to elastic contractive force of the elastic member 25, rises from the interior sheet 21 with the free end 24a directed inward, thereby providing leakage preventing portions (or cuffs) between the vicinity of the front end 25a and the vicinity of the rear end 25b.

The interior sheet 21 may be a liquid-permeable nonwoven fabric, a nonwoven fabric formed with a large number of apertures for passage of liquid, or a resin film formed with a large number of apertures for passage of liquid. The exterior sheet 22 may be a liquid-impermeable nonwoven fabric, such as a thermally bonded spunbonded-meltblown-spunbonded (SMS) composite nonwoven fabric. Alternatively, the exterior sheet 22 may be a resin film. If desired, a nonwoven fabric with which a hook member of a hook-and-loop fastener can engage, such as a spunlaced nonwoven fabric or a through-air bonded nonwoven fabric, may be further provided on the exterior surface of the liquid-impermeable nonwoven fabric or resin film used for the exterior sheet 22. The absorbent core 23 may be a layer of pulp or a mixture of pulp and superabsorbent polymer wrapped in a hydrophilic tissue or an air-laid pulp in which pulp is bonded together through a binder. The side sheet 24 may be the SMS nonwoven fabric or a spunbonded nonwoven fabric.

In the intermediate part 11, longitudinally extending side elastic members 26 are disposed inside the right and left side edges 16, 17. The side elastic members 26 are bonded between the interior sheet 21 and the exterior sheet 22 while being stretched in the longitudinal direction. The side elastic members 26 exert elastic contractive force to form gathers along the right and left side edges. Thus, the right and left side edges 16, 17 of the intermediate part 11 can be tightly wrapped around the thighs of the hind legs.

Furthermore, a laterally extending front end elastic member 27 is disposed along the front end 14 of the main body 2, and a laterally extending rear end elastic member 28 is disposed along the rear end 15 of the main body 2. The front end elastic member 27 and the rear end elastic member 28 are bonded between the interior sheet 21 and the exterior sheet 22 while being stretched in the lateral direction. The front end elastic member 27 exerts elastic contractive force to form waist gathers along the front end 14 of the main body 2, while the rear end elastic member 28 exerts elastic contractive force to form waist gathers along the rear end 15 of the main body 2.

In the rear of the intermediate part 11 of the main body 2, the interior sheet 21 and the exterior sheet 22 are cut to have a U-shaped cut 29, which does not overlap the absorbent core 23. The cut 29 defines an animal's tail insertion hole.

As shown in FIGS. 1 and 2, the main body 2 is symmetrical about a longitudinal centerline O. The abdomen part 12 has first and second movable parts 31, 32 on each side of the main body 2. Between the first and second movable parts 31, 32, the right and left side edges 16, 17 are recessed toward the longitudinal centerline O to have a recess (or indentation) 33. Thus, the first and second movable parts 31, 32 are separate from each other in the longitudinal direction. The first and second movable parts 31, 32 are of a layered structure with the interior sheet 21 bonded between the exterior sheet 22 and the side sheet 24.

The first and second movable parts 31, 32 easily bend in a thickness direction thereof (i.e., in a direction perpendicular to an XY-plane) independently of each other. Furthermore, the layered structure permits the first and second movable parts 31, 32 to approach and separate from each other, i.e., deform in both $\alpha$ and $\beta$ directions shown in FIG. 2. In order to permit the first and second movable parts 31, 32 to deform in both the $\alpha$ and $\beta$ directions, a depth Dx of the recess 33 is preferably equal to or greater than 20 mm, more preferably equal to or greater than 30 mm.

The first movable part 31 is provided with a first attachment tab 3. The first attachment tab 3 is a rectangular member (or strip) and may be made of a resin film, a nonwoven fabric, a woven fabric, or a laminate of a resin film and a nonwoven fabric. The first attachment tab 3 is bonded to the exterior surface of the exterior sheet 22 at the first movable part 31. The first attachment tab 3 projects laterally from the side edge of the main body 2, and a first engaging member 3a is provided on the interior surface of the projecting portion of the first attachment tab 3. Likewise, a second attachment tab 4 is bonded to the exterior sheet 22 at the second movable part 32, and a second engaging member 4a is provided on the interior surface of the second attachment tab 4 projecting from the main body 2.

As shown in FIG. 2, the back part 13 has first and second landing sheets 5, 6 which are slightly spaced in the longitudinal direction and secured to the exterior surface of the exterior sheet 22. More specifically, the first landing sheet 5 is located close to the intermediate part 11, while the second landing sheet 6 is located close to the rear end edge 15. When the absorbent article 1 is applied to an animal, as shown in FIG. 3, the first and second engaging members 3a, 4a are to be removably secured to the first and second landing sheets 5, 6, respectively.

The first and second landing sheets 5, 6 extend laterally continuously across the longitudinal centerline O to have a laterals size W2 and a lateral size W3, respectively. The laterals size W2 and the lateral size W3 are sufficiently larger than a lateral size W1 of the first and second engaging members 3a, 4a. Accordingly, the engagement position of the first engaging member 3a with the first landing sheet 5 may be adjusted within a wide range in the lateral direction depending on the body shape of animals. Also, the engagement position of the second engaging member 4a with the second landing sheet 6 may be adjusted within a wide range in the lateral direction.

As shown in FIG. 2, the first and second engaging members 3a, 4a may have an equal longitudinal size L1. The first landing sheet 5 has a longitudinal size L2, and the second landing sheet 6 has and a longitudinal size L3. The longitudinal sizes L2, L3 are sufficiently larger than the size L1 of the engaging members 3a, 4a. For instance, the sizes L2, L3 are at least twice the size L1. If the first and second engaging members 3a, 4a have different longitudinal sizes, on the other hand, the sizes L2, L3 may be at least twice the larger longitudinal size of the first and second engaging members 3a, 4a. Accordingly, the engagement position of the first engaging member 3a with the first landing sheet 5 may be adjusted within a wide range in the longitudinal direction depending on the body shape of animals. Also, the engagement position of the second engaging member 4a with the second landing sheet 6 may be adjusted within a wide range in the longitudinal direction.

As shown in FIG. 2, the first landing sheet 5 has longitudinally spaced marks 5a as a measure for engagement of the first engaging member 3a. Likewise, the second landing sheet 6 has longitudinally spaced marks 6a as a measure for engagement of the second engaging member 4a. Moreover, the first and second landing sheets 5, 6 may have laterally spaced marks as a measure for engagement of the first and second engaging members 3a, 4a. With the marks 5a, 6a, a consumer can easily understand the most appropriate engagement position of the engaging members 3a, 4a for a particular animal, ensuring that when the absorbent article 1 is replaced by a new one, the new absorbent article 1 can always be worn in an appropriate manner for the particular animal.

The first and second engaging members 3a, 4a and the first and second landing sheets 5, 6 constitute hook-and-loop fasteners. Specifically, the hook-and-loop fastener is constituted of male and female components, wherein the male component has a large number of hook-like or mushroom-like projections and the female component has a large number of projection-engageable elements such as loops. Such a hook-and-loop fastener is generally called a VELCRO fastener. Alternatively, the first and second attachment tabs 3, 4 may be sticky tapes (or pressure sensitive adhesive tapes), wherein the first and second engaging members 3a, 4a are sticky layers (or pressure sensitive adhesive layers). In this case, the first and second landing sheets 5, 6 are preferably resin films.

FIG. 3 shows a state where the absorbent article 1 is applied to an animal. In FIG. 3, the animal is a dog.

At first, the animal's tail is passed through the insertion hole defined by the cut 29 with the interior surface of the absorbent article 1 being directed toward the animal. The back part 13 of the main body 2 is applied to the animal's back, and the abdomen part 12 is applied to the animal's abdomen. Then, the first and second movable parts 31, 32 are pulled up until they overlap with the exterior surface of the back part 13, whereby the first engaging members 3a of the first attachment tabs 3 are secured to the first landing sheet 5, and the second engaging members 4a of the second attachment tabs 4 are secured to the second landing sheet 6.

As set forth above, the first and second movable parts 31, 32 are separate from each other in the longitudinal direction with the recess 33 provided therebetween, and the first and second attachment tabs 3, 4 are also separate from each other in the longitudinal direction. Deformation of the movable parts 31, 32, as well as deformation of the attachment tabs 3, 4, enables the positional relation between the first and second engaging members 3a, 4a to be changed relatively freely in both the lateral and longitudinal directions. Accordingly, the engagement position of the first engaging member 3a with the first landing sheet 5 and the engagement position of the second engaging member 4a with the second landing sheet 6 may be laterally adjusted independently of each other. Also, the engagement position of the first engaging member 3a with the first landing sheet 5 and the engagement position of the second engaging member 4a with the second landing sheet 6 may be longitudinally adjusted independently of each other.

For example, the side elastic members 26 of the intermediate part 11 can be sufficiently stretched by laterally and longitudinally adjusting the engagement position of the first engaging member 3a with the first landing sheet 5, whereby the right and left side edges 16, 17 of the intermediate part 11 can tightly fit around the thighs of the hind legs. In addition, the tension of the front and rear end elastic members 27, 28 can be appropriately controlled by laterally and longitudinally adjusting the engagement position of the second engaging member 4a with the second landing sheet 6, whereby the abdomen part 12 and the back part 13 can tightly fit around the waist.

As described above, since the tightening degree and tightening direction by the first movable parts 31 can be adjusted independently of the tightening degree and tightening direction by the second movable parts 32, the absorbent article 1 can tightly fit around both the thighs of the hind legs and the waist. This is effective in keeping the absorbent core 23 containing area in contact with the animal's excretory part and preventing slippage of the absorbent article 1.

Figure 4:
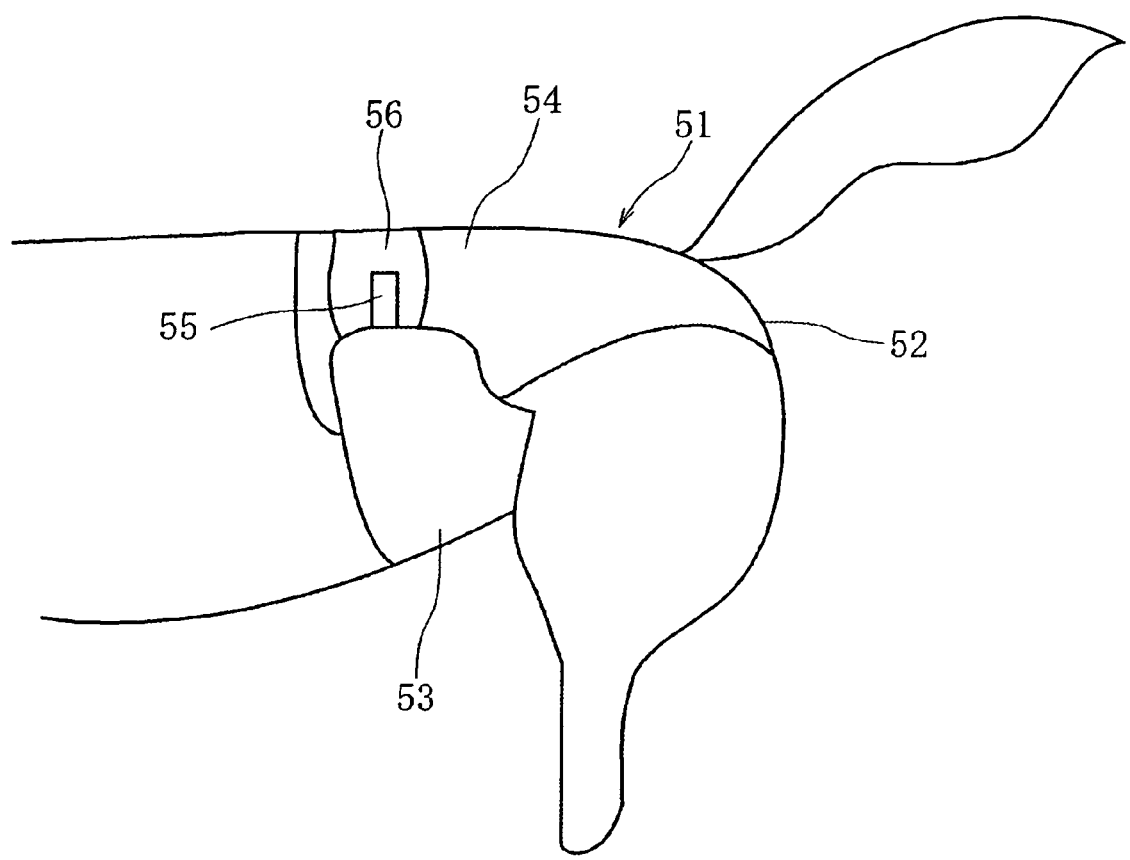
FIG. 4 is an explanatory diagram showing a state where a conventional absorbent article is applied to an animal.

FIG. 4 is an explanatory diagram showing a state where a conventional absorbent article 51 is applied to an animal for comparison with the absorbent article 1.

The conventional absorbent article 51 has an intermediate part 52, an abdomen part 53 and a back part 54, wherein only one attachment tab 55 is provided on each side of the abdomen part 53 and only one landing sheet 56 is provided on the back part 54.

When the absorbent article 51 is applied to an animal, the tightening degree of the absorbent article 51 against the animal can be adjusted only by changing the engagement position of the attachment tab 55 with the landing sheet 56. Therefore, if the attachment tabs 55 are pulled up to tightly wrap the absorbent article 51 around the thighs of the hind legs, the abdomen part 53 and the back part 54 tend to be loose around the waist. On the other hand, tightly wrapping the absorbent article 51 around the waist tends to cause looseness around the thighs. The foregoing embodiment, in which the tightening around the thighs and the tightening around the waist can be adjusted independently of each other, hardly causes the disadvantage of the conventional absorbent article 51.

Hereinbelow, other embodiments of the present invention will be described. In the following embodiments, unless otherwise stated, the absorbent article has the same construction as the absorbent article 1 according to the first embodiment.

Figure 5:
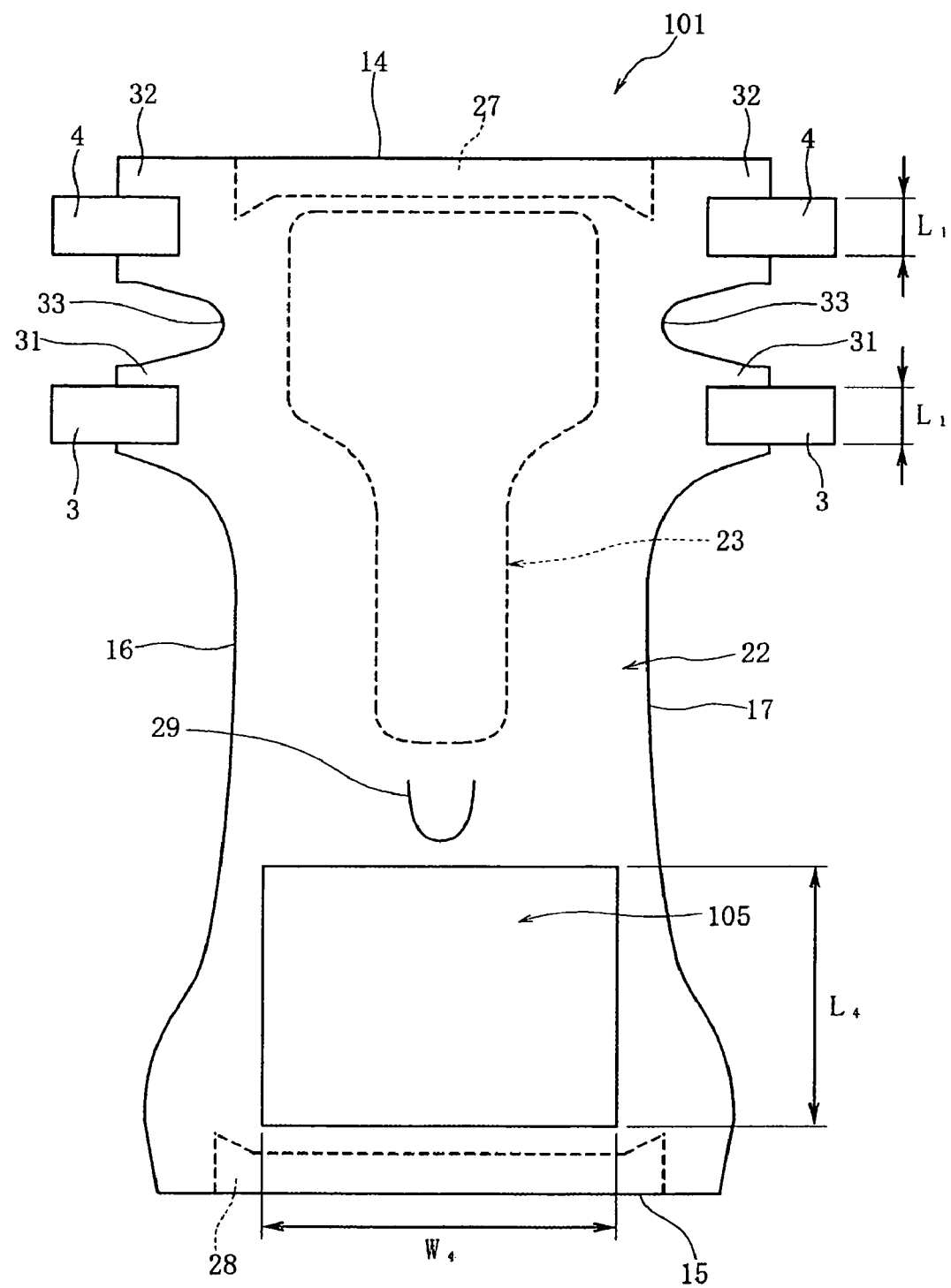
FIG. 5a is a plan view showing an exterior surface of an absorbent article according to a second embodiment of the present invention and FIG. 5b is a plan view showing an exterior surface of an absorbent article to another embodiment of the present invention.
Figure 5B:
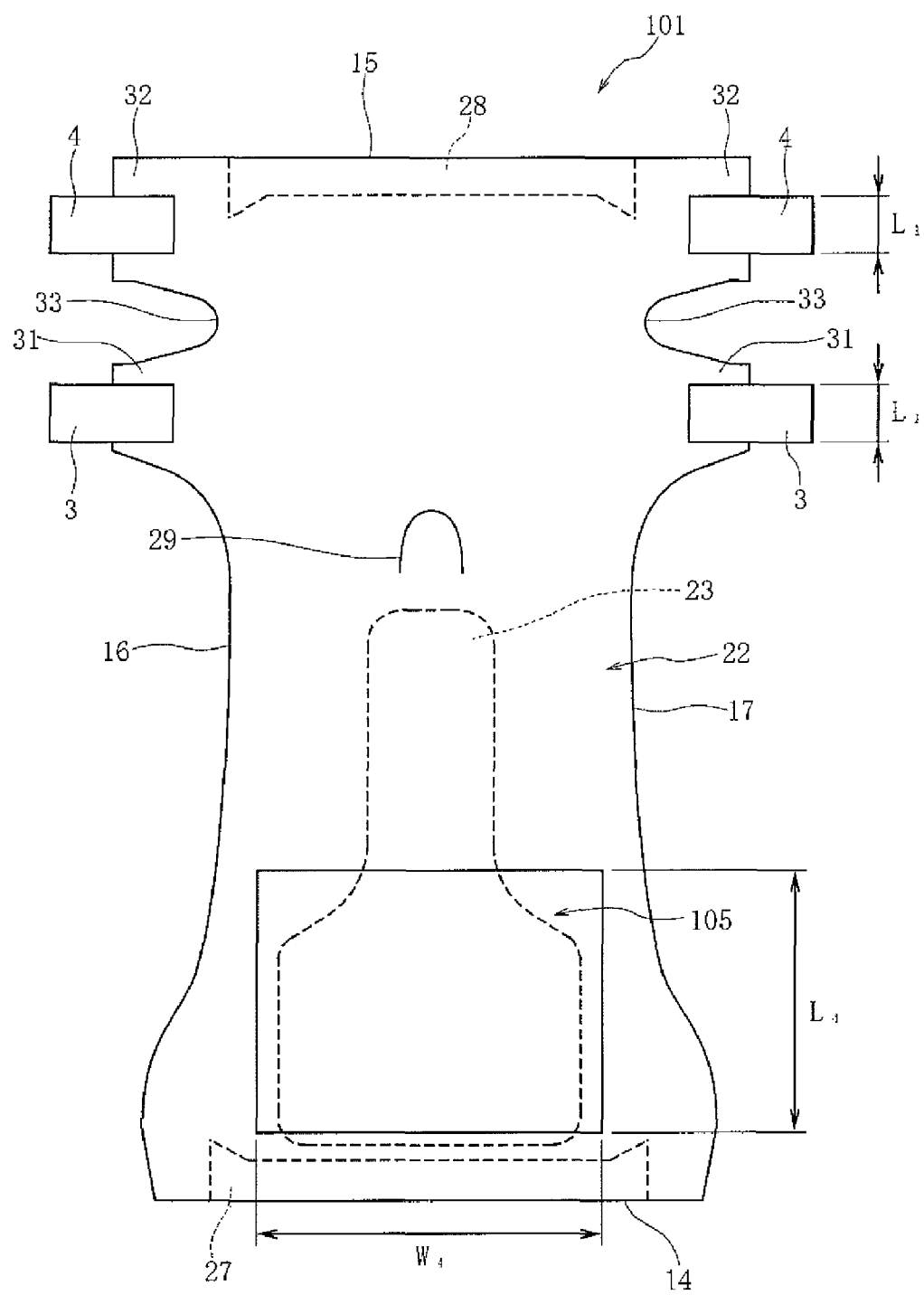

FIG. 5 is a plan view corresponding to FIG. 2 and showing an exterior surface of an absorbent article 101 according to a second embodiment of the present invention.

The absorbent article 101 has a single landing sheet 105 on the exterior sheet 22, i.e., on the exterior surface of the back part 13. The landing sheet 105 has a lateral size W4, which is sufficiently larger than the lateral size W1 of the first and second engaging members 3a, 4a, and a longitudinal size L4, which is equal to or larger than the sum of the size L2 of the first landing sheet 5 and the size L3 of the second landing sheet 6 shown in FIG. 2. The longitudinal size L4 of the landing sheet 105 is at least four times the longitudinal size L1 of the engaging members 3a, 4a.

Also in the absorbent article 101, the engagement position of the first engaging member 3a with the landing sheet 105 and the engagement position of the second engaging member 4a with the landing sheet 105 can be adjusted arbitrarily within a wide range in the lateral and longitudinal directions.

If the first and second engaging members 3a, 4a have a large number of hook-like or mushroom-like projections to function as a male component of a hook-and-loop fastener, a projection-engageable sheet may be provided at least over the entire exterior surface of the back part 13 to eliminate either or both of the first and second landing sheets 5, 6. Such a projection-engageable sheet (i.e., a sheet with which a large number of projections of the first and second engaging members 3a, 4a are allowed to engage) may be a nonwoven fabric with movable fibers on its sheet surface, such as a spunlaced nonwoven fabric or a through-air bonded nonwoven fabric.

If the first and second engaging members 3a, 4a are sticky layers (or pressure sensitive adhesive layers), on the other hand, the engagement position of the first engaging member 3a and the engagement position of the second engaging member 4a may be adjusted arbitrarily by making the exterior sheet 22 out of a resin film or a nonwoven fabric. In any case, the embodiments of the present invention ensure that the engagement position of the first engaging member 3a and the engagement position of the second engaging member 4a with the exterior surface of the absorbent article can be adjusted within a wide range in the lateral and longitudinal directions.

Figure 6A:
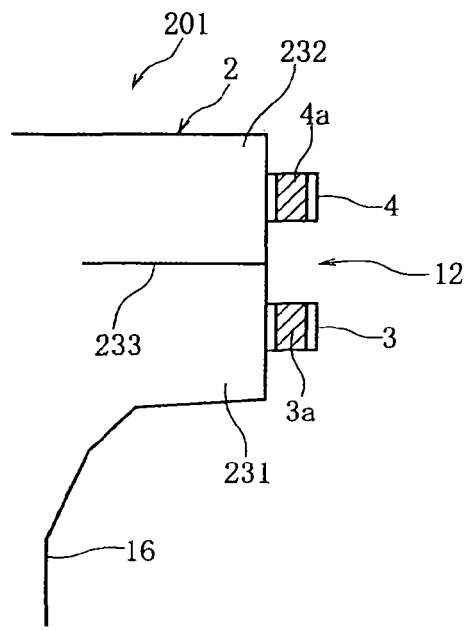
FIGS. 6(A) and 6(B) are partial plan views showing a part of an interior surface of an absorbent article according to a third embodiment of the present invention.
Figure 6B:
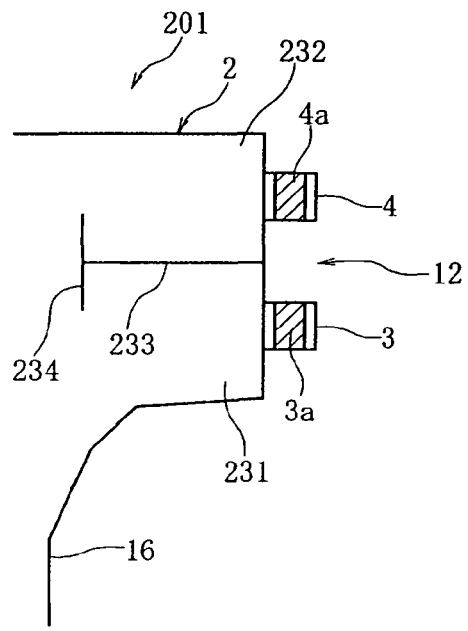

FIGS. 6(A) and 6(B) are partial plan views showing a part of an interior surface of an absorbent article 201 according to a third embodiment of the present invention.

In the abdomen part 12 of the absorbent article 201 shown in FIG. 6(A), a straight cut 233 extends laterally from each of the right and left side edges 16, 17 of the main body 2 toward the longitudinal centerline O to separate first and second movable parts 231, 232 in the longitudinal direction. To the first and second movable parts 231, 232, there are secured the first and second attachment tabs 3, 4, respectively. In the absorbent article 201 shown in FIG. 6(A), the first and second movable parts 231, 232 thus separated from each other can be deformed independently of each other.

In the abdomen part 12 of the absorbent article 201 shown in FIG. 6(B), another cut 234 is provided to meet (preferably at right angles) with the cut 233 shown in FIG. 6(A). In this embodiment, the cut 234 meeting with the cut 233 facilitates deformation of the first and second movable parts 231, 232 away from each other in the longitudinal direction. Therefore, the tightening directions by the first and second engaging members 3a, 4a with respect to an animal can easily be adjusted independently of each other.

Figure 7A:
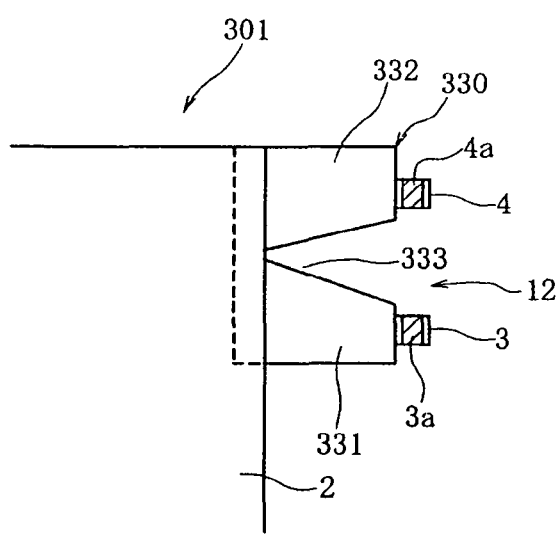
FIGS. 7(A) and 7(B) are partial plan views showing a part of an interior surface of an absorbent article according to a fourth embodiment of the present invention.
Figure 7B:
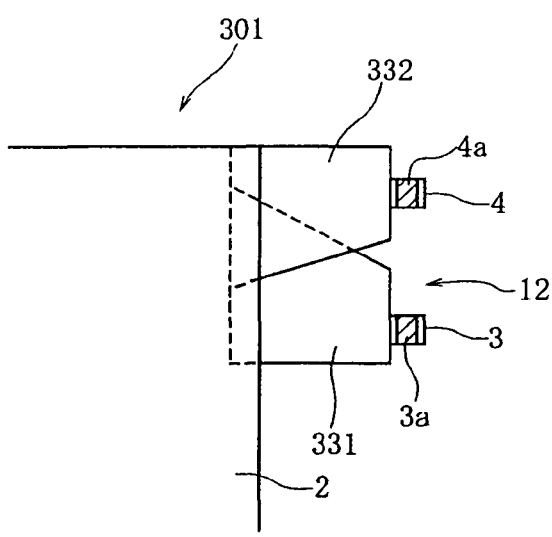

FIGS. 7(A) and 7(B) are partial plan views showing a part of an interior surface of an absorbent article 301 according to a fourth embodiment of the present invention.

In the abdomen part 12 of the absorbent article 301 shown in FIG. 7(A), an attachment auxiliary member 330 is disposed on each side of the main body 2 to project laterally from the main body 2. The attachment auxiliary member 330 is formed with first and second movable parts 331, 332 and a recess 333 separating the movable parts 331, 332 from each other. To the first and second movable parts 331, 332, there are secured the first and second attachment tabs 3, 4, respectively.

The attachment auxiliary member 330 may be made of any material as long as it is a flexible sheet such as a nonwoven fabric and a resin film. However, the attachment auxiliary member 330 is preferably a stretchable sheet so as to facilitate deformation of the first and second movable parts 331, 332. For example, the stretchable sheet may be a stretchable nonwoven fabric made of stretchable fibers such as polyurethane fibers or a stretchable woven fabric containing polyurethane fibers. Alternatively, the stretchable sheet may be a stretchable resin film.

In the absorbent article 301 shown in FIG. 7(B), the first and second movable parts 331, 332 are made of separate attachment auxiliary members. These attachment auxiliary members may be made of the same material as the attachment auxiliary member 330 shown in FIG. 7(A). In the embodiment shown in FIG. 7(B), the separate attachment auxiliary members facilitate independent movement of the first and second movable parts 331, 332.

Figure 8:
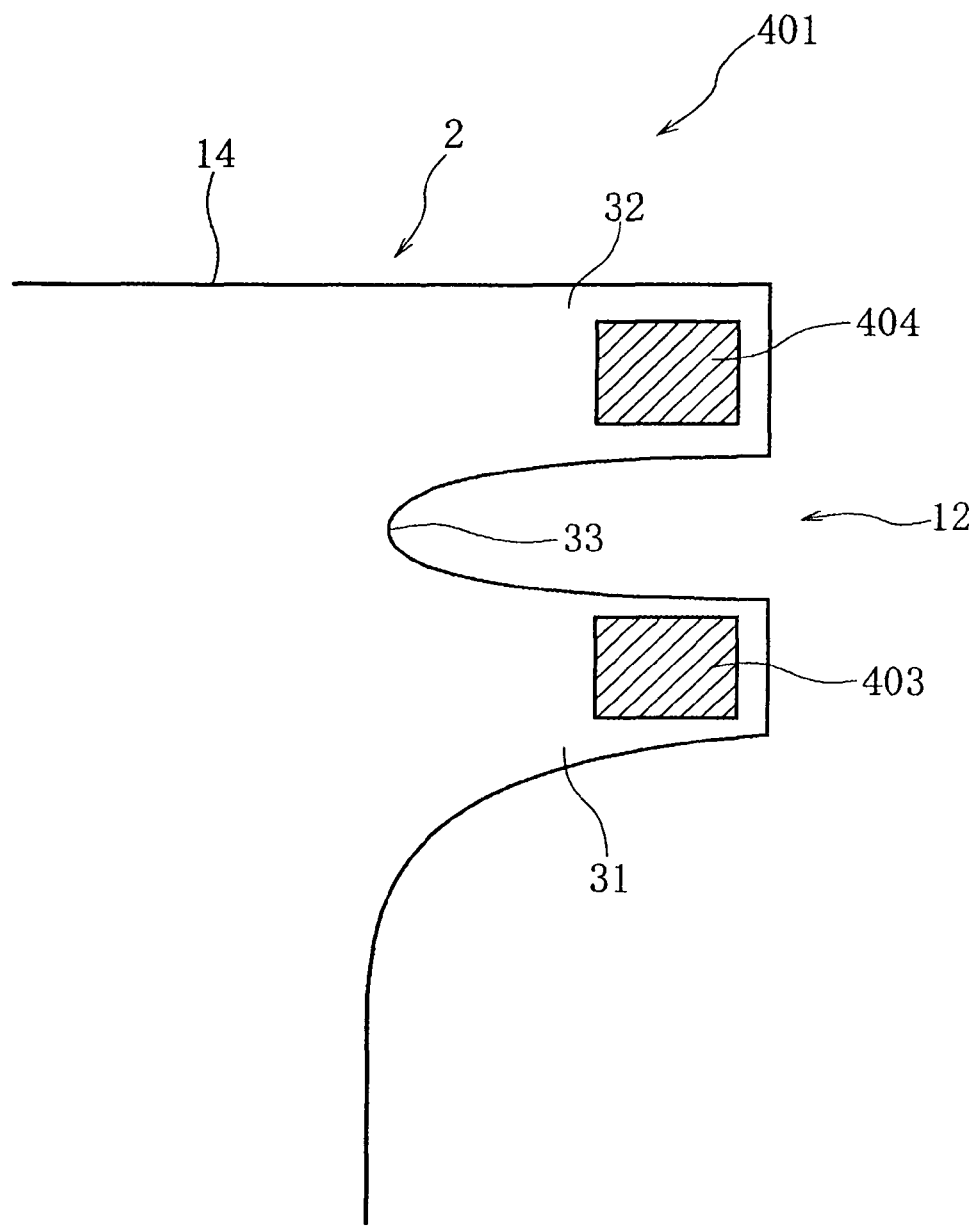
FIG. 8 is a partial plan view showing a part of an interior surface of an absorbent article according to a fifth embodiment of the present invention.

FIG. 8 is a partial plan view showing a part of an interior surface of an absorbent article 401 according to a fifth embodiment of the present invention.

In the absorbent article 401 of the fifth embodiment, the first and second movable parts 31, 32 are integrally formed with the main body 2 on each side of the abdomen part 12 but separated from each other by the recess 33, as in the absorbent article 1 shown in FIG. 1. In this embodiment, however, a first engaging member 403 is directly secured to the interior surface of the first movable part 31, and a second engaging member 404 is directly secured to the interior surface of the second movable part 32, without providing the attachment tabs 3, 4. The distance between the first and second engaging members 403, 404 may be changed arbitrarily because the first and second movable parts 31, 32 are permitted to move independently of each other. In this case, the depth of the recess 33 is preferably equal to or greater than 30 mm.

Figure 9A:
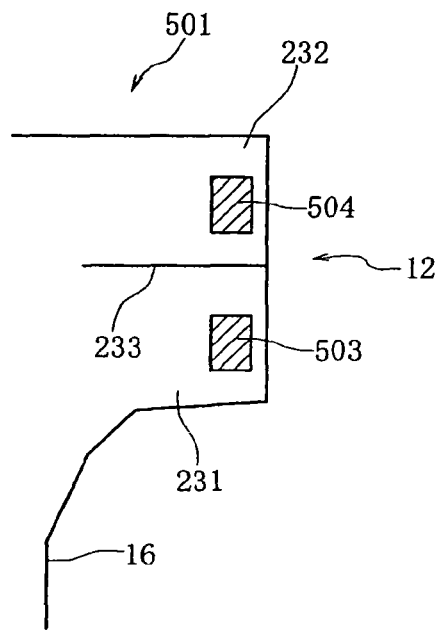
FIGS. 9(A) and 9(B) are partial plan views showing a part of an interior surface of an absorbent article according to a sixth embodiment of the present invention.
Figure 9B:
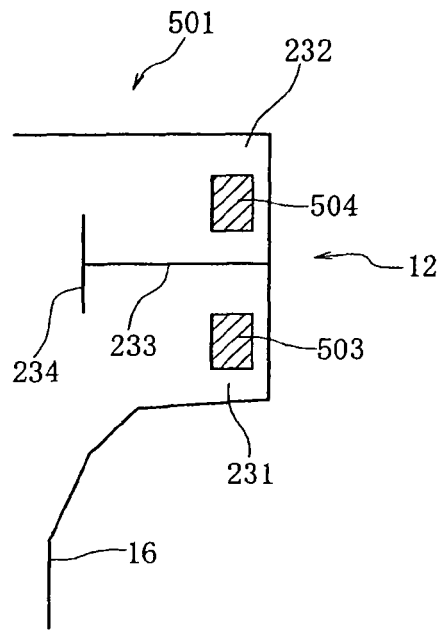

FIGS. 9(A) and 9(B) are partial plan views showing a part of an interior surface of an absorbent article 501 according to a sixth embodiment of the present invention.

The absorbent article 501 shown in FIGS. 9(A) and 9(B) has the first and second movable parts 231, 232 identical to those shown in FIGS. 6(A) and 6(B). Also in the absorbent article 501, a first engaging member 503 is directly secured to the interior surface of the first movable part 231, and a second engaging member 504 is directly secured to the interior surface of the second movable part 232, without providing the attachment tabs 3, 4.

Figure 10A:
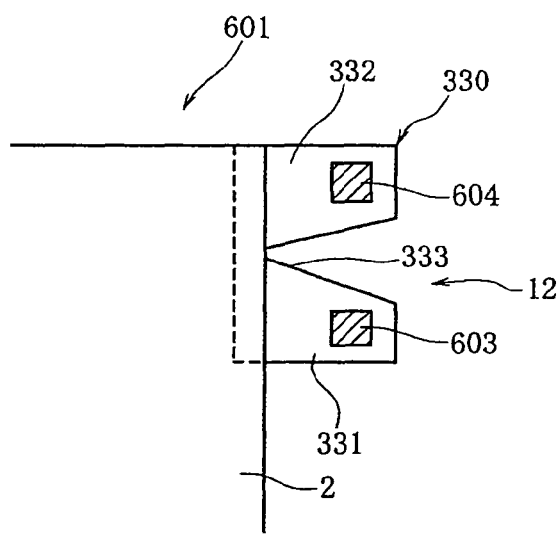
FIGS. 10(A) and 10(B) are partial plan views showing a part of an interior surface of an absorbent article according to a seventh embodiment of the present invention.
Figure 10B:
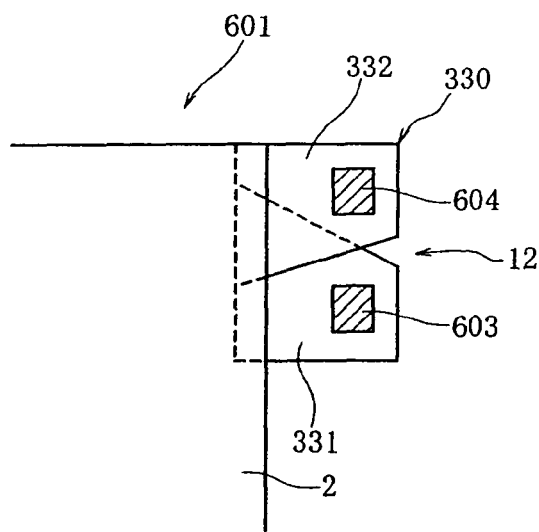

FIGS. 10(A) and 10(B) are partial plan views showing a part of an interior surface of an absorbent article 601 according to a seventh embodiment of the present invention.

The absorbent article 601 shown in FIGS. 10(A) and 10(B) has the first and second movable parts 331, 332 identical to those shown in FIGS. 7(A) and 7(B). In the absorbent article 601, a first engaging member 603 is directly secured to the interior surface of the first movable part 331, and a second engaging member 604 is directly secured to the interior surface of the second movable part 332.

Also in the embodiments shown in FIGS. 9 and 10, independent movement of the first and second movable parts ensures that the engagement position of the first engaging member with the exterior surface of the absorbent article and the engagement position of the second engaging member with the exterior surface of the absorbent article can be adjusted arbitrarily.

Figure 11:
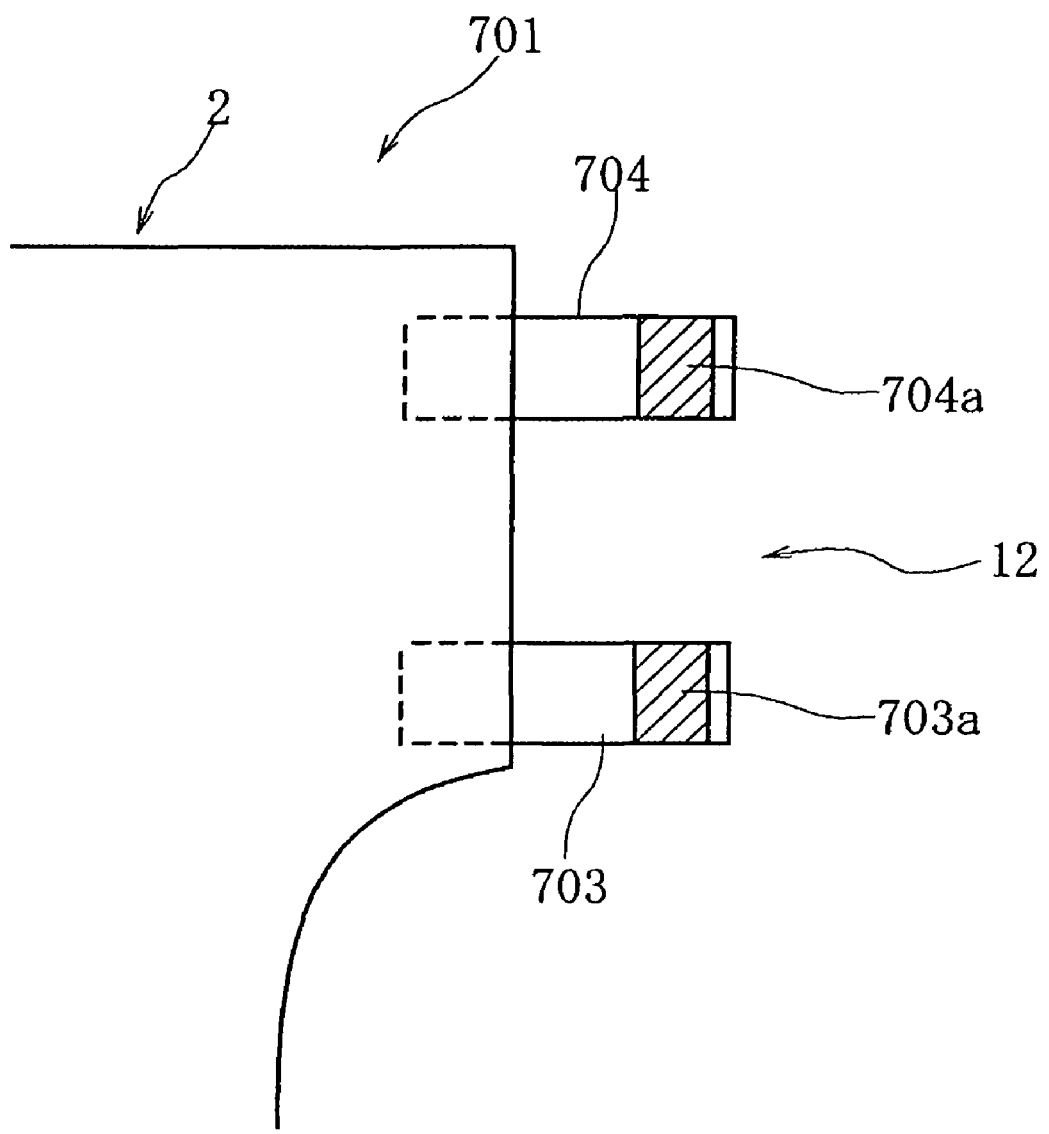
FIG. 11 is a partial plan view showing a part of an interior surface of an absorbent article according to an eighth embodiment of the present invention.

FIG. 11 is a partial plan view showing a part of an interior surface of an absorbent article 701 according to an eighth embodiment of the present invention.

In the abdomen part 12 of the absorbent article 701, relatively long first and second attachment tabs 703, 704 are disposed on each side of the main body 2. To the first attachment tab 703, a first engaging member 703a is secured at a location spaced apart from the side edge of the main body 2. To the second attachment tab 704, a second engaging member 704a is secured at a location spaced apart from the side edge of the main body 2. The relatively long attachment tabs 703, 704 thus provided facilitate approach and separation of the first and second engaging members 703a, 704a.

Figure 12:
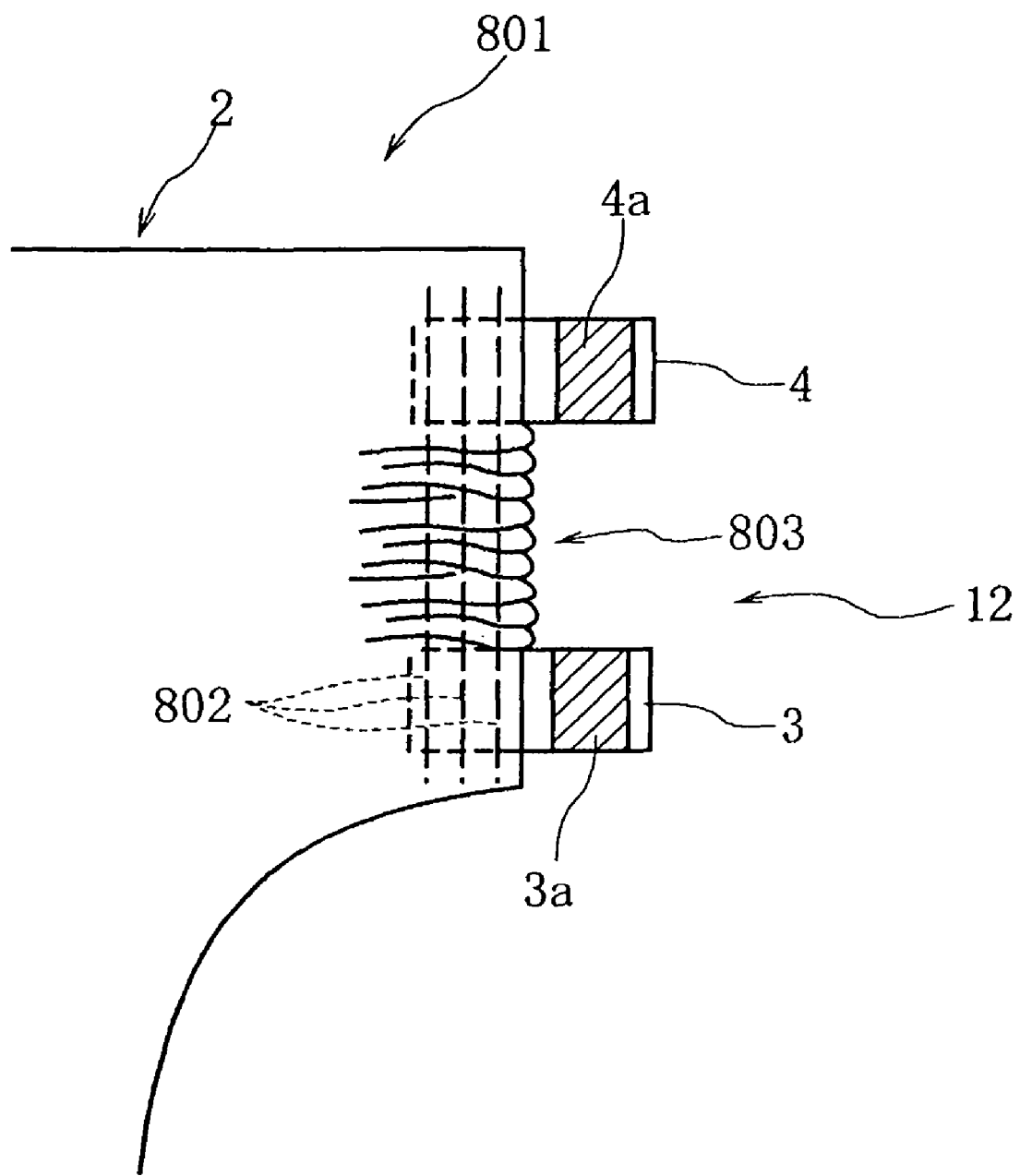
FIG. 12 is a partial plan view showing a part of an interior surface of an absorbent article according to a ninth embodiment of the present invention.

FIG. 12 is a partial plan view showing a part of an interior surface of an absorbent article 801 according to a ninth embodiment of the present invention.

In the abdomen part 12 of the absorbent article 801, the first and second attachment tabs 3, 4 shown in FIG. 1 are disposed on each side of the main body. Alternatively, the attachment tabs 703, 704 shown in FIG. 11 may be disposed in place of the attachment tabs 3, 4.

Along each side of the main body, there is disposed an elastic member 802 for exerting longitudinal elastic contractive force. When no external force is exerted, the elastic member 802 brings the first and second attachment tabs 3, 4 closer to each other to provide the main body 2 with gathers 803. The absorbent article 801 can be applied such that after the absorbent article 801 is tightly wrapped around the thighs of the hind legs by securing the first engaging members 3a to the first landing sheet 5, the second engaging members 4a are secured to the second landing sheet 6 by stretching the gathers 803 and moving the second attachment tabs 4 away from the first attachment tabs 3. Also in the absorbent article 801, the tightening around the thighs and the tightening around the waist can be adjusted independently.

In the foregoing embodiments, the abdomen part 12 is provided with the first and second engaging members, but it is also possible to provide the first and second engaging members and associated members (e.g., the first and second movable parts) on each side of the back part 13 so that the first and second engaging members can be removably secured to the exterior surface of the abdomen part.

Furthermore, although the foregoing embodiments are depicted as being of the type which can be opened as shown in FIGS. 1 and 2, the absorbent article may be of a so-called pants-type having leg openings which are formed by partially joining the right and left side edges 16, 17 to themselves. In this case, the right and left side edges of the abdomen part 12 may be left unjoined to the right and left side edges of the back part 13 so that the tightening around the thighs and the tightening around the waist may be performed independently by the first and second engaging members 3a, 4a.

Although the present invention has been illustrated and described with respect to exemplary embodiments thereof, it should be understood by those skilled in the art that the foregoing and various other changes, omission and additions may be made therein and thereto, without departing from the spirit and scope of the present invention. The present invention should not be understood as limited to the specific embodiments set out above but should be understood to include all possible embodiments which can be embodied within a scope encompassed and equivalent thereof with respect to the feature set out in the appended claims.

What is claimed is:

1. An absorbent article for a four-footed animal having an interior surface for facing the animal and an exterior surface opposite the interior surface, the absorbent article comprising:
   an abdomen part for facing the abdomen of the animal;
   a back part for facing the back of the animal, wherein a direction along the absorbent article proceeding from the abdomen part toward the back part defines a longitudinal direction of the absorbent article;
   a main body comprising the abdomen part and the back part, and having lateral sides;
   the abdomen part comprising two pairs of movable parts, each pair of movable parts respectively having a recess therebetween and being spaced apart from each other along the longitudinal direction, each of the pairs of movable parts respectively being provided at a lateral side of the abdomen part, each movable part of each pair of movable parts having an outer lateral side edge;
   four attachment tabs, each attachment tab being secured to and projecting laterally away from one of the movable parts;
   four engaging members, each engagement member being provided with one of the attachment tabs and configured to be removably securable to the exterior surface of the back part, wherein
   each recess is recessed from the outer lateral side edges of the adjacent movable parts toward the longitudinal centerline, the movable parts in each pair of movable parts are divided along the longitudinal direction by one of the recesses, and each recess is configured and arranged to enable the engaging members and the attachment tabs secured to each of the movable parts to increase or decrease a longitudinal distance therebetween, and
   the exterior surface has at least one landing sheet which permits the removable securement of the engaging members, the landing sheet being horizontally centered on the exterior surface of the back part.

2. The absorbent article of claim 1, wherein the at least one landing sheet permits reposition of the engaging members along the longitudinal direction.

3. The absorbent article of claim 1, wherein each recess has a depth that is greater than or equal to 20 mm.

4. The absorbent article of claim 1, wherein the at least one landing sheet has longitudinally spaced marks.

5. An absorbent article for a four-footed animal having an interior surface for facing the animal and an exterior surface opposite the interior surface, the absorbent article comprising:
   an abdomen part for facing the abdomen of the animal;
   a back part for facing the back of the animal, wherein a direction along the absorbent article proceeding from the abdomen part toward the back part defines a longitudinal direction of the absorbent article;
   a main body comprising the abdomen part and the back part, and having lateral sides;
   the abdomen part comprising two pairs of movable parts, each pair of movable parts respectively having a first cut line therebetween and being spaced apart from each other along the longitudinal direction, each of the pairs of movable parts respectively being provided at a lateral side of the abdomen part, each movable part of said pair of movable parts having an outer lateral side edge;
   four attachment tabs, each attachment tab being secured to and projecting laterally away from one of the movable parts;
   four engaging members, each engagement member being provided with one of the attachment tabs and configured to be removably securable to the exterior surface at the back part, wherein
   each first cut line extends inwardly from the outer lateral side edges of the adjacent movable parts toward the longitudinal centerline, the movable parts in each pair of movable parts are divided along the longitudinal direction by a recess, and each first cut line is configured and arranged to enable the engaging members and the attachment tabs secured to each of the movable parts to increase or decrease a longitudinal distance therebetween, and
   the exterior surface has at least one landing sheet which permits the removable securement of the engaging members, the landing sheet being horizontally centered on the exterior surface of the back part.

6. The absorbent article of claim 5, further comprising a second straight cut line perpendicular to and joining the first cut line at an end of the first cut line closest to the longitudinal centerline of the absorbent article.

7. The absorbent article of claim 5, wherein the at least one landing sheet permits repositioning of the engaging members along the longitudinal direction.

8. The absorbent article of claim 5, wherein the at least one landing sheet has longitudinally spaced marks.

9. An absorbent article for a four-footed animal having an interior surface for facing the animal and an exterior surface opposite the interior surface, the absorbent article comprising:
   an abdomen part for facing the abdomen of the animal;
   a back part for facing the back of the animal, wherein a direction along the absorbent article proceeding from the abdomen part toward the back part defines a longitudinal direction of the absorbent article;
   a main body comprising the abdomen part the back part, and having lateral sides;
   the back part comprising two pairs of movable parts, each pair of movable parts respectively having a recess therebetween and being spaced apart from each other along the longitudinal direction, each of the pairs of movable parts respectively being provided at a lateral of the back part, each movable part of each pair of movable parts having an outer lateral side edge;

four attachment tabs, each attachment tab being secured to and projecting laterally away from one of the movable parts;

four engaging members, each engagement member being provided with one of the attachment tabs and configured to be removably securable to the exterior surface at the abdomen part, wherein each recess is recessed from a the outer lateral side edges of the adjacent movable parts toward the longitudinal centerline, the movable parts in each pair of movable parts are divided along the longitudinal direction by one of the recesses, and each recess is configured and arranged to enable the engaging members and the attachment tabs secured to each of the movable parts to increase or decrease a longitudinal distance therebetween, and the exterior surface has at least one landing sheet which permits the removable securement of the engaging members, the landing sheet being horizontally centered on the exterior surface of the abdomen part.

10. The absorbent article of claim 9, wherein the at least one landing sheet permits repositioning of the engaging members along the longitudinal direction.

11. The absorbent article of claim 9, wherein each recess has a depth that is greater than or equal to 20 mm.

12. The absorbent article of claim 9, wherein the at least one landing sheet has longitudinally spaced marks.

13. An absorbent article for a four-footed animal having an interior surface for facing the animal and an exterior surface opposite the interior surface, the absorbent article comprising:

an abdomen part for facing the abdomen of the animal;

a back part for facing the back of the animal, wherein a direction along the absorbent article proceeding from the abdomen part toward the back part defines a longitudinal direction of the absorbent article;

a main body having the abdomen part, the back part, and lateral sides;

the abdomen part comprising two pairs of movable parts, each pair of movable parts respectively having a first cut line therebetween and being spaced apart from each other along the longitudinal direction, each of the pairs of movable parts respectively being provided at a lateral side of the back part, each movable part of each pair of movable parts having an outer lateral side edge;

four attachment tabs, each attachment tab being secured to and projecting laterally away from one of the movable parts;

four engaging members, each engagement member being provided with one of the attachment tabs and configured to be removably securable to the exterior surface at the abdomen part, wherein each first cut line extends inwardly from the lateral outer side edges of the adjacent movable parts toward the longitudinal centerline, the movable parts in each pair of movable parts are divided along the longitudinal direction by a recess, and each first cut line is configured and arranged to enable the engaging members and the attachment tabs secured to each of the movable parts to increase or decrease a longitudinal distance therebetween, and the exterior surface has at least one landing sheet which permits the removable securement of the engaging members, the landing sheet being horizontally centered on the exterior surface of the abdomen part.

14. The absorbent article of claim 13, wherein the at least one landing sheet permits repositioning of the engaging members along the longitudinal direction.

15. The absorbent article of claim 13, further comprising a second straight cut line perpendicular to and joining the first cut line at an end of the first cut line closest to the longitudinal centerline of the absorbent article.

16. The absorbent article of claim 13, wherein the at least one landing sheet has longitudinally spaced marks.

* * * * *